(12) United States Patent
Yokawa et al.

(10) Patent No.: US 9,897,850 B2
(45) Date of Patent: Feb. 20, 2018

(54) DISPLAY APPARATUS

(71) Applicant: FUNAI ELECTRIC CO., LTD., Osaka (JP)

(72) Inventors: Akira Yokawa, Osaka (JP); Akihiro Fujikawa, Osaka (JP); Yasuyuki Fukumoto, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 14/095,081

(22) Filed: Dec. 3, 2013

(65) Prior Publication Data

US 2014/0176858 A1    Jun. 26, 2014

(30) Foreign Application Priority Data

Dec. 26, 2012 (JP) ................. 2012-283624

(51) Int. Cl.
*G02F 1/1335* (2006.01)
*H04N 5/64* (2006.01)
*G02F 1/1333* (2006.01)

(52) U.S. Cl.
CPC .. *G02F 1/133603* (2013.01); *G02F 1/133608* (2013.01); *G02F 2001/133314* (2013.01); *H04N 5/64* (2013.01)

(58) Field of Classification Search
CPC ......... G02F 1/133603; G02F 1/133608; G02F 2001/133314; H04N 5/64
USPC .................................................. 349/58–64
See application file for complete search history.

(56) References Cited

U.S. PATENT DOCUMENTS

| 7,259,964 | B2* | 8/2007 | Yamamura et al. ......... 361/697 |
| 7,976,210 | B2 | 7/2011 | Shinozaki |
| 8,421,725 | B2* | 4/2013 | Chen et al. ..................... 345/87 |
| 8,833,956 | B2 | 9/2014 | Matsumoto |
| 2006/0262241 | A1* | 11/2006 | Jeong ............................. 349/58 |
| 2007/0171353 | A1* | 7/2007 | Hong ............... G02F 1/133603 349/161 |
| 2007/0279930 | A1* | 12/2007 | Aoki ................ G02F 1/133608 362/561 |
| 2009/0109655 | A1 | 4/2009 | Shinozaki |
| 2009/0225254 | A1* | 9/2009 | Matsuzawa et al. ........... 349/58 |
| 2010/0328862 | A1* | 12/2010 | Wang ............... G02F 1/133308 361/679.01 |
| 2011/0261290 | A1* | 10/2011 | Kim ...................... G02B 6/0021 349/64 |

(Continued)

FOREIGN PATENT DOCUMENTS

| JP | 6-27464 | 2/1994 |
| JP | 2005-43813 | 2/2005 |

(Continued)

*Primary Examiner* — Charles Chang
(74) *Attorney, Agent, or Firm* — Wenderoth, Lind & Ponack, L.L.P.

(57) ABSTRACT

A display apparatus for displaying an image, including: a liquid-crystal panel which displays the image; a back light which emits light toward a rear face of the liquid-crystal panel; a rear frame which supports the back light via a screw; and a rear cover which covers part of a face of the rear frame which is different from a face of the rear frame on which the back light is provided, wherein the back light extends beyond an inner-frame region of the rear frame covered by the rear cover, and the screw is provided only in the inner-frame region.

11 Claims, 9 Drawing Sheets

(56) References Cited

U.S. PATENT DOCUMENTS

| 2012/0162566 A1 | 6/2012 | Shimomichi |
| 2012/0188489 A1 | 7/2012 | Baba et al. |
| 2012/0287347 A1 | 11/2012 | Matsumoto |

FOREIGN PATENT DOCUMENTS

| JP | 2007-27056 | 2/2007 |
| JP | 2007-156438 | 6/2007 |
| JP | 2007-311561 | 11/2007 |
| JP | 2009-224207 | 10/2009 |
| JP | 2012-37605 | 2/2012 |
| JP | 2012-79733 | 4/2012 |
| JP | 2012-123338 | 6/2012 |
| JP | 2012-138300 | 7/2012 |
| WO | 2011/074334 | 6/2011 |

* cited by examiner

FIG. 10

DISPLAY APPARATUS

CROSS REFERENCE TO RELATED APPLICATION

The present application is based on and claims priority of Japanese Patent Application No. 2012-283624 filed on Dec. 26, 2012. The entire disclosure of the above-identified application, including the specification, drawings and claims is incorporated herein by reference in its entirety.

FIELD

The present invention relates to display apparatuses for displaying images.

BACKGROUND

There have conventionally been direct-backlit display devices, such as liquid-crystal television receivers and so on, which include back lights that emit light toward the rear face of a display panel (see Patent Literature (PTL) 1, for example). A housing of such a display device includes a resin-made front cabinet on the display panel side and a resin-made rear cabinet on the back light side. Furthermore, between the front cabinet and the rear cabinet, there is provided a rear frame for supporting back lights so as to allow heat conduction. The back lights include a heat sink, a wiring substrate joined to the heat sink, and a plurality of light emitting diodes (LEDs) mounted on the wiring substrate. The heat sink is fastened to the rear frame via a plurality of screws.

The rear frame, the heat sink, and the wiring substrate are each formed of a metal having high heat conductivity (for example, aluminum or the like). When the LEDs each emit light, heat from the LED is transferred to the heat sink through the wiring substrate, and heat from the heat sink is transferred to the rear frame. By doing so, the heat from each of the LEDs is radiated through the heat sink and the rear frame.

CITATION LIST

Patent Literature

[PTL 1] Japanese Unexamined Patent Application Publication No. 2007-311561

SUMMARY

Technical Problem

In recent years, there is a demand for thinner display apparatuses with the aim of space saving. A conceivable method to meet the demand is to omit the above-stated rear cabinet, exposing part of the rear frame to outside the display device, for example.

However, since the heat from each of the LEDs is transferred to the rear frame as mentioned above, the rear frame will have a relatively high temperature. For ensuring security when a user touches the rear frame, it is an objective to reduce the temperature rise inside the region of the rear frame exposed to outside the display apparatus.

The present invention is devised to achieve the above objective and aims to provide a display apparatus in which the temperature rise inside the region of the rear frame exposed to outside can be reduced.

Solution to Problem

In order to achieve the above object, a display apparatus according to an aspect of the present invention is a display apparatus for displaying an image, comprising: a display panel which displays the image; a back light which emits light toward a rear face of the display panel; a rear frame which supports the back light via a connecting part; and a rear cover which covers part of a face of the rear frame, the face being different from a face of the rear frame on which the back light is provided, wherein the back light extends beyond a covered region of the rear frame, the covered region being a region covered by the rear cover, and the connecting part is provided only in the covered region.

Since part of the heat from the back lights is transferred to the rear frame through the connecting part, the rear frame has a relatively high temperature at the connecting part. According to this aspect, the connecting part which will have a relatively high temperature is provided only in the region of the rear frame covered by the rear cover, with the result that the temperature rise inside the region of the rear frame exposed to outside the display apparatus can be reduced.

For example, the display apparatus according to an aspect of the present invention may have a configuration such that the back light and the rear frame is spaced apart from each other outside the covered region.

According to this aspect, the back light and the rear frame are spaced apart from each other, with the result that the heat transfer from the back light to outside the region of the rear frame covered by the rear cover can be blocked. With this, the temperature rise inside the region of the rear frame exposed to outside the display apparatus can be effectively reduced.

For example, the display apparatus according to an aspect of the present invention may have a configuration such that an inner face of the rear frame outside the covered region is positioned on a side of an inner face of the rear frame inside the covered region opposite a side on which the back light is positioned.

According to this aspect, the inner face of the rear frame outside the region of the rear frame covered by the rear cover is positioned on the side of the inner face of the rear frame inside the region opposite the side on which the back light is positioned. With such a relatively simple configuration, the back light and the rear frame can be spaced apart from each other.

For example, the display apparatus according to an aspect of the present invention may have a configuration such that the back light and the rear frame have a heat insulating sheet therebetween outside the covered region.

According to this aspect, the back light and the rear frame have a heat insulating sheet therebetween, with the result that the heat transfer from the back light to outside the region of the rear frame covered by the rear cover can be effectively blocked.

For example, the display apparatus according to an aspect of the present invention may have a configuration such that the back light includes: a heat sink supported by the rear frame and capable of conducting heat to the rear frame; a wiring substrate joined to the heat sink; and a light-emitting element mounted on the wiring substrate, and a transverse dimension of the heat sink outside the covered region is larger than a transverse dimension of the heat sink inside the covered region.

According to this aspect, the transverse dimension of the heat sink outside the region of the rear frame covered by the rear cover is set to be relatively large, with the result that the heat radiation property of the heat sink outside the region can be enhanced.

For example, in the display apparatus according to an aspect of the present invention, the rear frame may be configured so as to include a slit in part of a periphery of the connecting part which is located on an outer side inside the covered region.

According to this aspect, the rear frame includes a slit in part of the periphery of the connecting part which is located on the outer side inside the region of the rear frame covered by the rear cover, with the result that the efficiency of heat transfer from the connecting part to outside the region is relatively low. With this, the temperature rise outside the above region of the rear frame can be effectively reduced.

For example, the display apparatus according to an aspect of the present invention may have a configuration such that the slit extends in an arc in the part of the periphery of the connecting part which is curved on the outer side inside the covered region.

According to this aspect, the slit extends in an arc in part of the periphery of the connecting part such that the arc is curved on the outer side inside the region of the rear frame covered by the rear cover, with the result that the efficiency of heat transfer from the connecting part to outside the region of the rear frame can be effectively reduced.

For example, the display apparatus according to an aspect of the present invention may have a configuration such that the slit includes a bent edge portion bent toward the display panel or bent opposite from the display panel.

According to this aspect, the slit includes the bent edge portion bent toward the display panel or bent opposite from the display panel, which can result in the slit of the rear frame having enhanced strength.

For example, the display apparatus according to an aspect of the present invention may have a configuration such that a plurality of the back lights are provided, the back lights are arranged substantially parallel to each other, and a plurality of the connecting parts provided for the respective back lights are arranged in a staggered pattern.

According to this aspect, the connecting parts are arranged in the staggered pattern, with the result that the temperature distribution inside the region of the rear frame covered by the rear cover can be substantially uniform.

Advantageous Effects

With the present invention, it is possible to reduce the temperature rise inside the region of the rear frame exposed to outside the display apparatus.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Embodiments of the present invention will be described in detail below with reference to the drawings. It is to be noted that each of the embodiments described below indicates a preferred specific example of the present invention. The numerical values, shapes, materials, structural elements, the arrangement and connection of the structural elements, steps, the order of the steps etc. shown in the following embodiments are examples, and therefore do not intend to limit the present invention. The present invention is defined by the Claims. Therefore, among the structural elements in the following embodiments, structural elements not recited in any one of the independent claims are not necessarily required to achieve the objective of the present invention, but are described as elements which are included in more preferred embodiments.

Embodiment 1

[Configuration of Display Apparatus]

Figure 1:
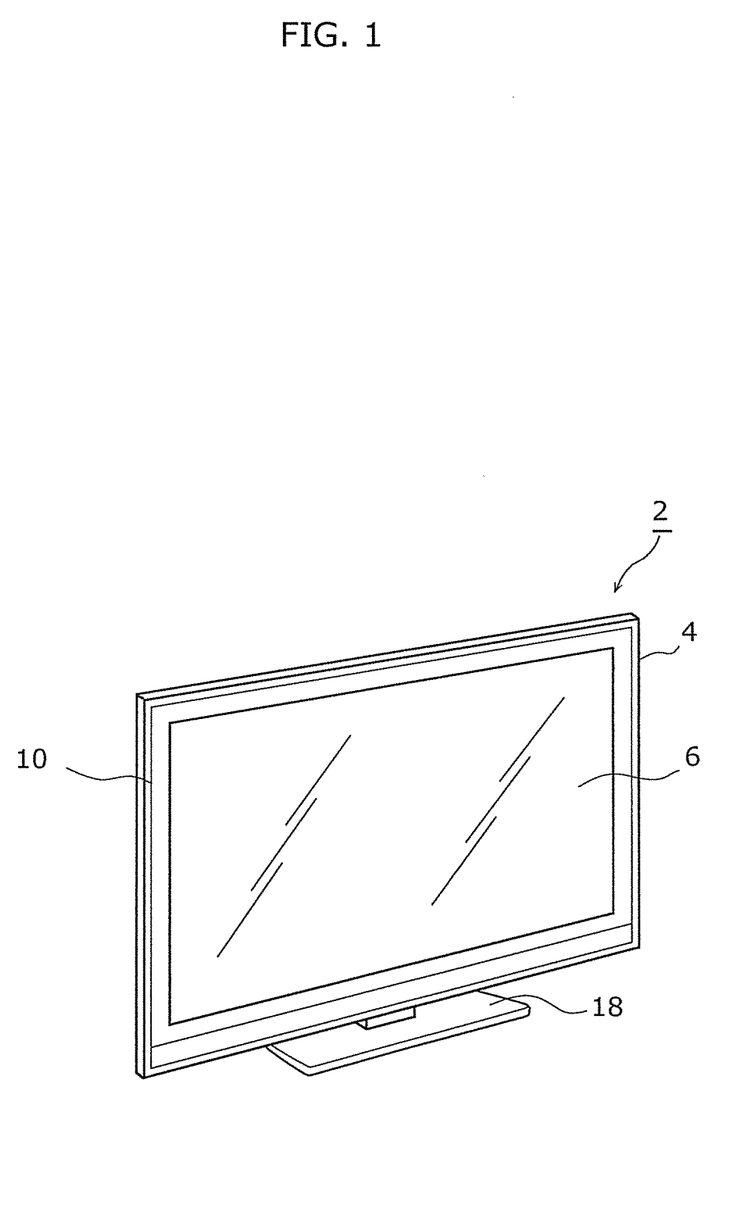
FIG. 1 is a perspective view showing, from the front side, a display apparatus according to Embodiment 1 of the present invention.
Figure 2:
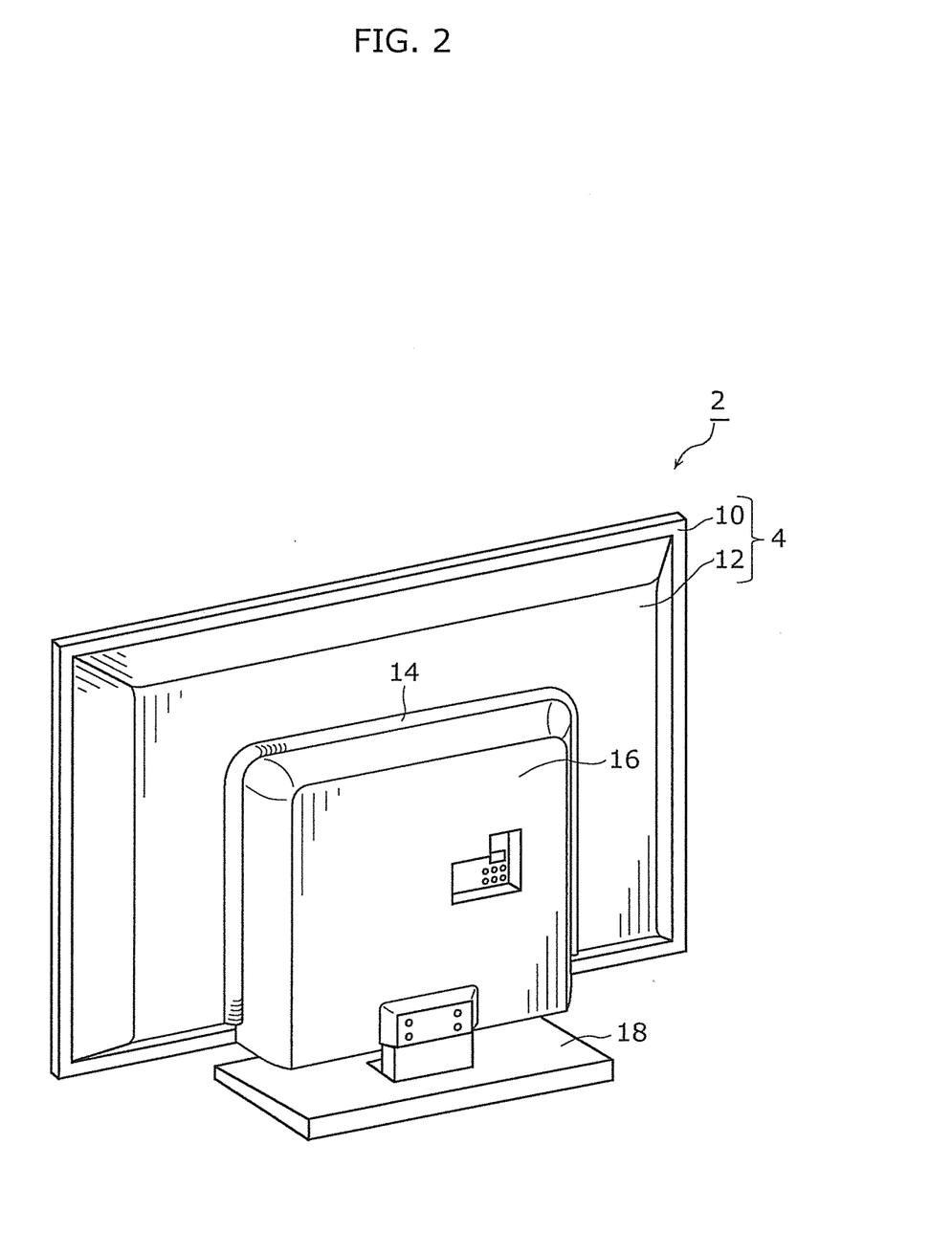
FIG. 2 is a perspective view showing the display apparatus of FIG. 1 from the rear side.
Figure 3:
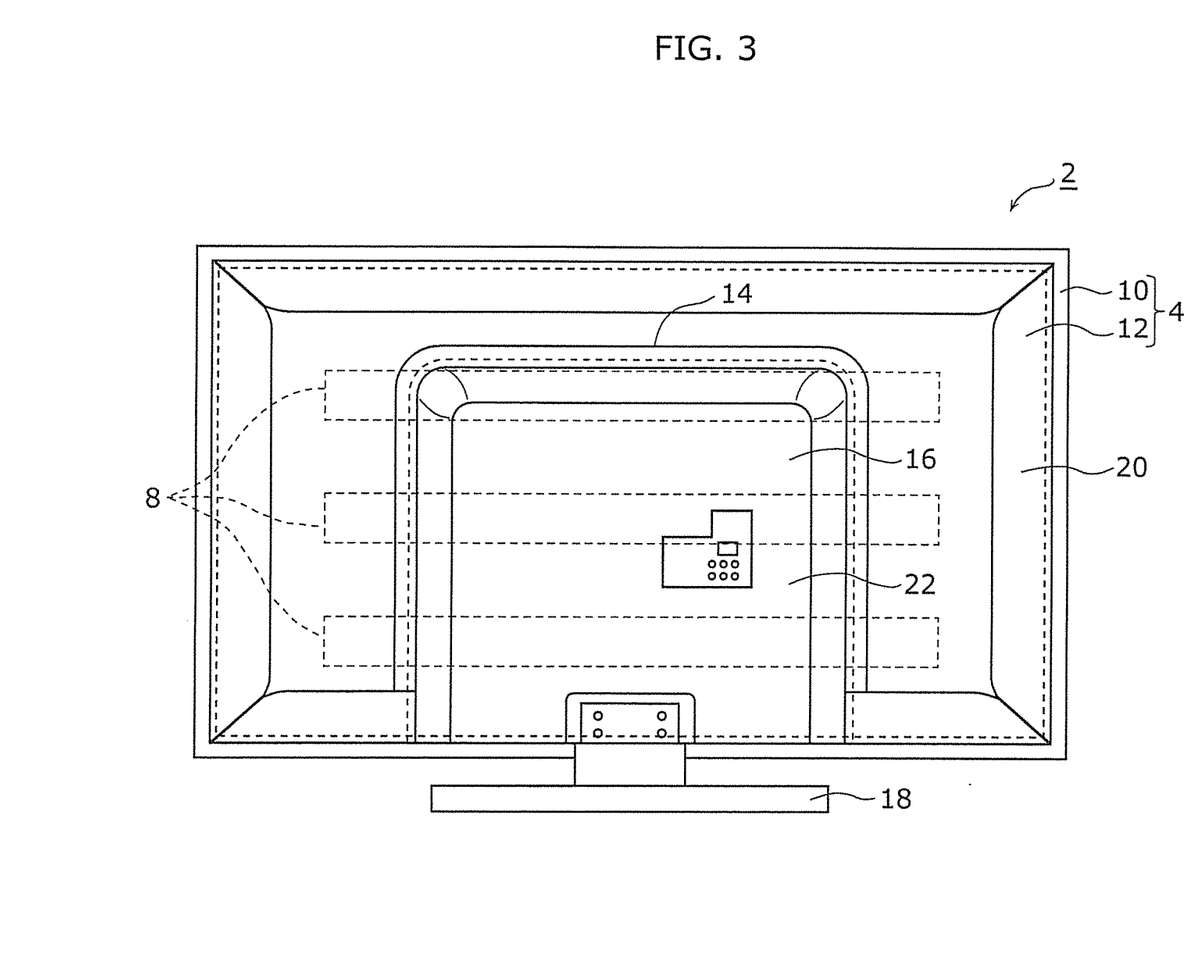
FIG. 3 is a plan view showing the display apparatus of FIG. 1 from the rear side.
Figure 4:
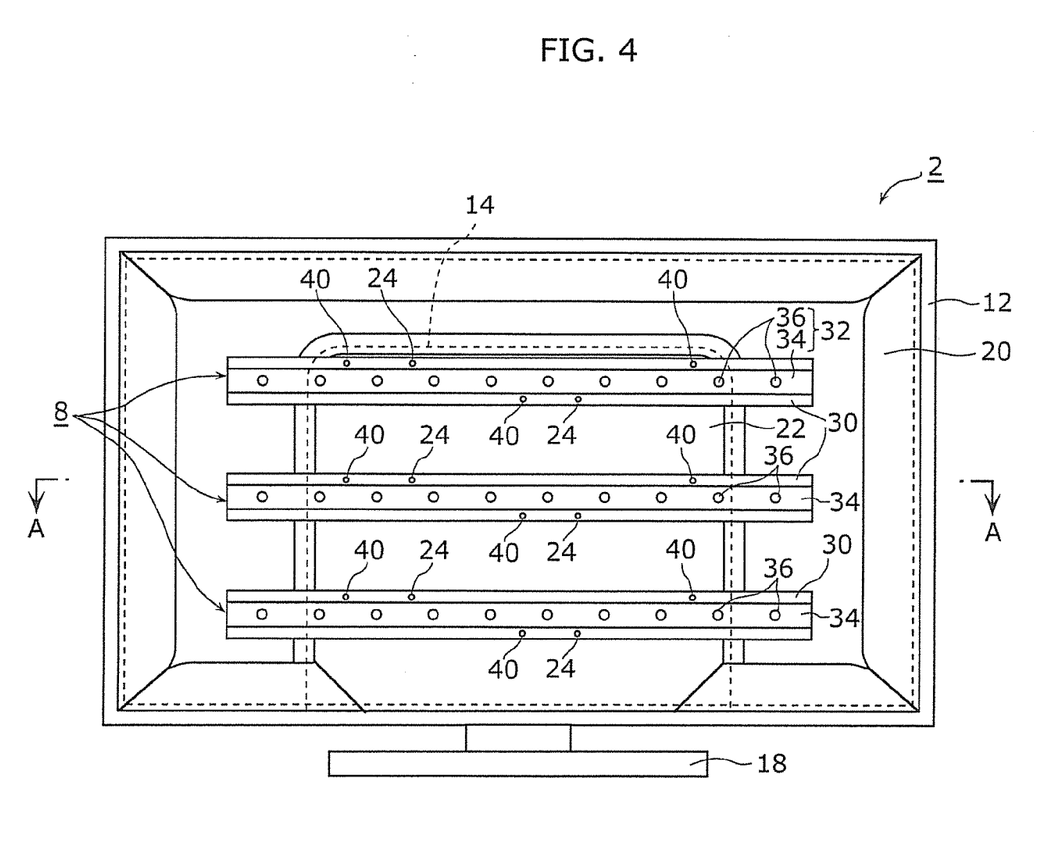
FIG. 4 is a plan view showing the interior of the display apparatus of FIG. 1.
Figure 5:
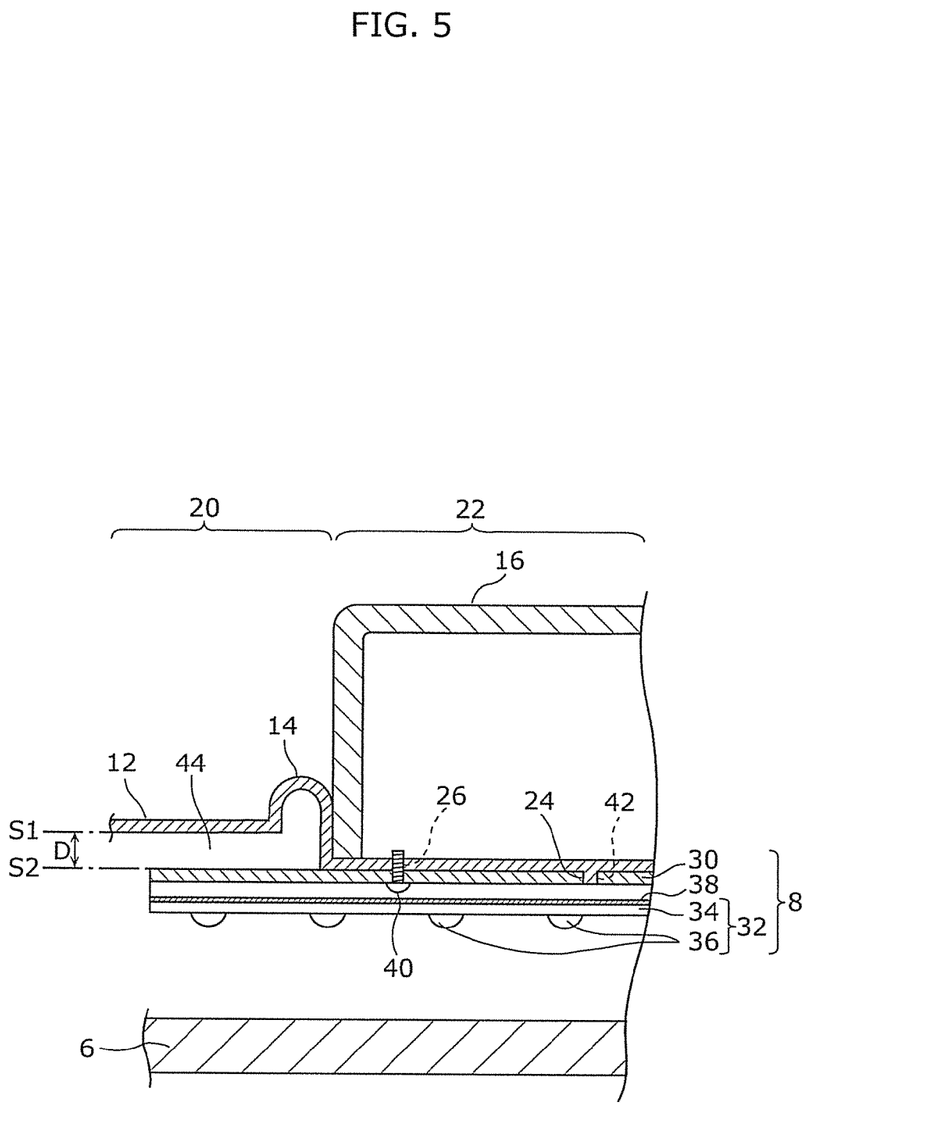
FIG. 5 is a main-part sectional view of the display apparatus taken along line A-A in FIG. 4.
Figure 6:
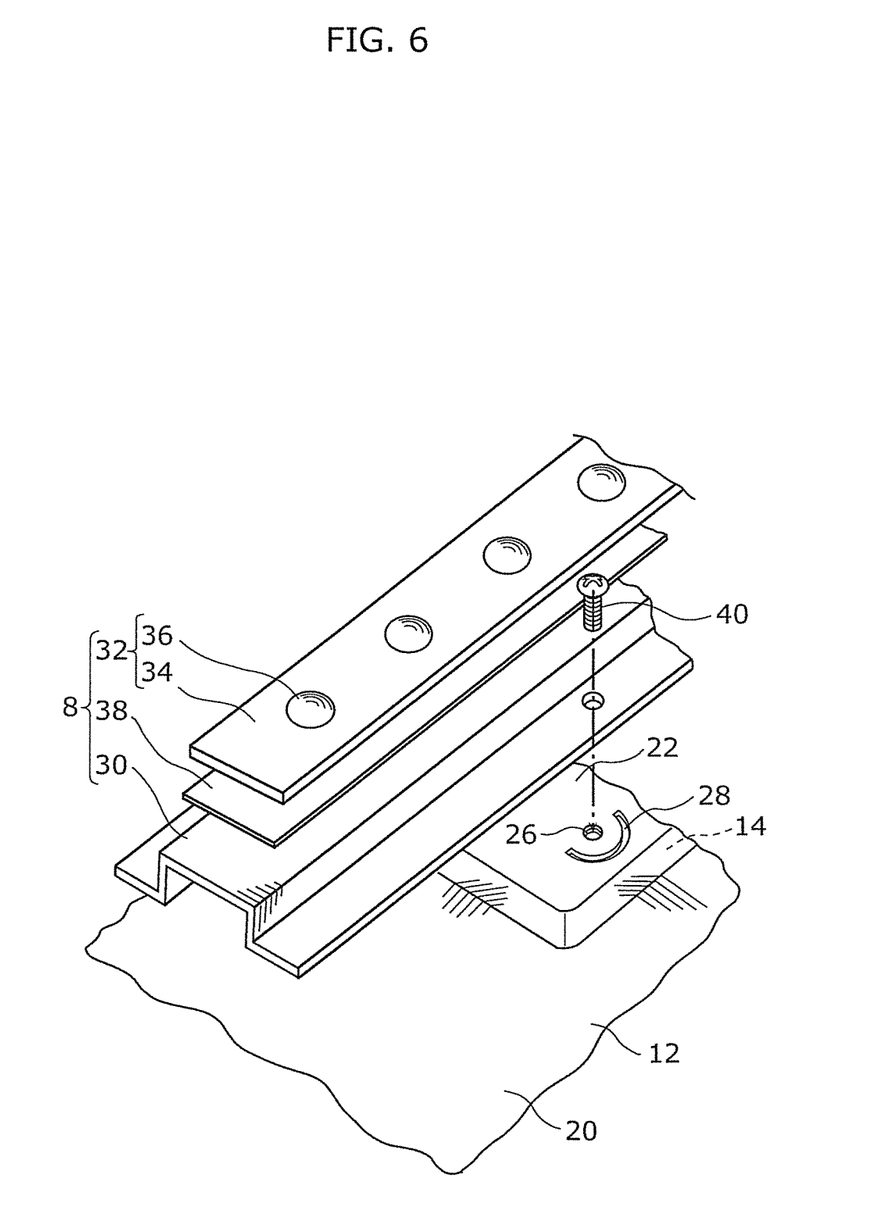
FIG. 6 is a main-part perspective view showing an exploded version of a back light.
Figure 7:
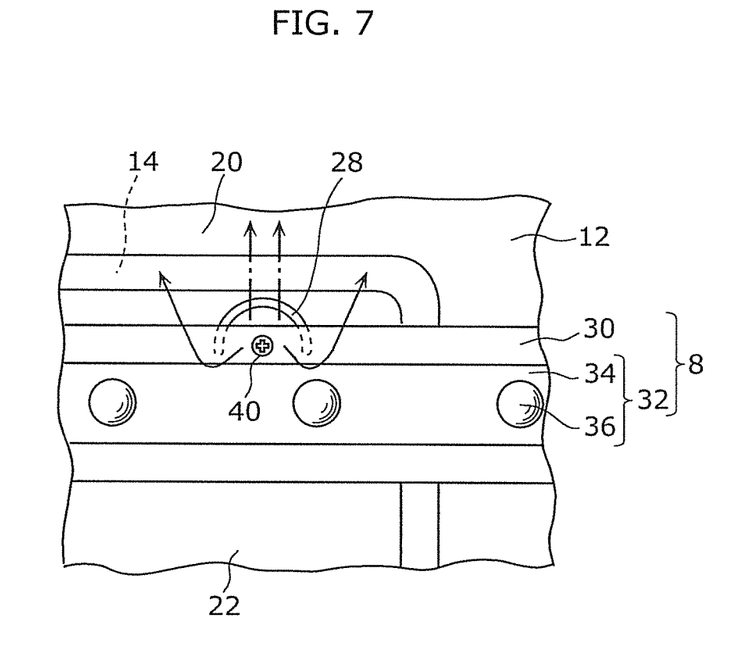
FIG. 7 is a plan view showing a magnified version of a slit and its surrounding area.

Firstly, a display apparatus according to Embodiment 1 of the present invention is described with reference to FIG. 1 to FIG. 7. FIG. 1 is a perspective view showing, from the front side, the display apparatus according to Embodiment 1 of the present invention. FIG. 2 is a perspective view showing the display apparatus of FIG. 1 from the rear side. FIG. 3 is a plan view showing the display apparatus of FIG. 1 from the rear side. FIG. 4 is a plan view showing the interior of the display apparatus of FIG. 1. FIG. 5 is a main-part sectional view of the display apparatus taken along line A-A in FIG. 4. FIG. 6 is a main-part perspective view showing an exploded version of a back light. FIG. 7 is a plan view showing a magnified version of a slit and its surrounding area.

A display apparatus 2 shown in the drawings includes a housing 4, and a liquid-crystal panel 6 (which constitutes a display panel) and a plurality of back lights 8, both of which are provided inside the housing 4. The display apparatus 2 in this embodiment is a liquid-crystal television receiver which adopts the direct-backlit system and includes the back lights 8.

The housing 4 includes a front cabinet 10 and a rear frame 12 which are combined with each other.

The front cabinet 10 is provided on the front side of the liquid-crystal panel 6. The front cabinet 10 is formed into a frame shape and covers an outer-circumferential portion of the liquid-crystal panel 6. It is to be noted that the front cabinet 10 is formed of resin or the like, for example.

The liquid-crystal panel 6 is supported together with a diffuser panel (not shown) or the like by the front cabinet 10 with a cell guide (not shown) therebetween. With the rear face irradiated with light from the back lights 8 (described hereinafter), the display panel 6 displays images.

The rear frame 12 is provided on the rear side of the liquid-crystal panel 6. The rear frame 12 is slightly swollen in shape in the opposite direction from the liquid-crystal panel 6 and covers the whole rear face of the liquid-crystal panel 6. In a central area on the outer face of the rear frame 12 (which is a face different from the face on which the back lights 8 are provided), a power source substrate (not shown) or the like for supplying electric power to the liquid-crystal panel 6, the back lights 8, and the like is mounted. It is to be noted that the rear frame 12 is formed of a metal having high heat conductivity, such as aluminum, for example.

The rear frame 12 includes a protruding portion 14 for positioning a rear cover 16 (described hereinafter) with respect to the rear frame 12. This protruding portion 14 extends along an outer-circumferential portion of the rear cover 16 and protrudes a little in the opposite direction from the liquid-crystal panel 6 as shown in FIG. 3 and FIG. 5.

To the outer face of the rear frame 12, the rear cover 16 is joined. The above-stated power source substrate or the like is covered by this rear cover 16. When the outer-circumferential portion of the rear cover 16 comes into contact with an inner-circumferential portion of the protruding portion 14, the rear cover 16 is positioned with respect to the rear frame 12. To a lower end portion of the rear cover 16, a stand 18 for supporting the housing 4 from below is joined. It is to be noted that the rear cover 16 is formed of resin or the like, for example.

As shown in FIG. 3 and FIG. 4, out of the region of the rear frame 12, a region not covered by the rear cover 16 is referred to as an outer-frame region 20 and a region covered by the rear cover 16 is referred to as an inner-frame region 22. In other words, the outer-frame region 20 is located outside the inner-frame region 22. As shown in FIG. 5, an inner face S1 of the rear frame 12 in the outer-frame region 20 is positioned on the side of an inner face S2 of the rear frame 12 in the inner-frame region 22 opposite the side on which the back lights 8 are positioned. To put it another way, the inner face S1 of the rear frame 12 in the outer-frame region 20 is behind the inner face S2 of the rear frame 12 in the inner-frame region 22 by a predetermined distance D (in the order of several millimeters (mm), for example) on the opposite side from the back lights 8.

Furthermore, the inner face of the rear frame 12 (that is, the face on which the back lights 8 are provided) is provided with a plurality of protrusions 24 for positioning a heat sink 30 (described hereinafter) with respect to the rear frame 12. Each of the protrusions 24 protrudes a little on the liquid-crystal panel 6 side as shown in FIG. 5.

Furthermore, the rear frame 12 is provided with a plurality of screw holes 26 for fastening with screws 40 (described hereinafter). In the rear frame 12, a plurality of slits 28 are provided for the respective screws 40 as shown in FIG. 6 and FIG. 7. Each of the slits 28 extends in an arc in part of a periphery of the screw 40 such that the arc is curved on the outer side inside the outer-frame region 20. A function of this slit 28 is described later.

The back lights 8 are supported by the inner face of the rear frame 12 as shown in FIG. 4 so as to allow heat conduction to the inner face of the rear frame 12 (that is, to allow the heat from each of the back lights 8 to be transferred to the rear frame 12). When supplied with electric power from the above-stated power source substrate, each of the back lights 8 emits light toward the rear face of the liquid-crystal panel 6. Crossing the inner-frame region 22, each of the back lights 8 extends linearly until both end portions thereof are in the outer-frame region 20. The back lights 8 are arranged substantially parallel to each other.

Each of the back lights 8 includes the heat sink 30 and an LED bar 32 joined to the heat sink 30 as shown in FIG. 6. The heat sink 30 has an elongated plate shape. The LED bar 32 includes a wiring substrate 34 and a plurality of LEDs 36 (which constitute light-emitting elements) mounted on the wiring substrate 34. The wiring substrate 34 has an elongated plate shape. The LEDs 36 are arranged at intervals in line along the longitudinal direction of the wiring substrate 34. The wiring substrate 34 is joined to the heat sink 30 with a double sided tape 38 having heat conductivity. Each of the heat sink 30 and the wiring substrate 34 is formed of a metal having high heat conductivity, such as aluminum, for example.

The heat sink 30 is fastened to the rear frame 12 with the screws 40 (which constitute connecting parts). As a feature of the display apparatus 2 in this embodiment, the screws 40 are arranged only in the inner-frame region 22 as shown in FIG. 4. In other words, the screws 40 are not provided in the outer-frame region 20. Each of the screws 40 is formed of a metal, such as SUS, for example.

Furthermore, the heat sink 30 includes a plurality of through holes 42 for the respective protrusions 24 stated above. As shown in FIG. 5, the protrusion 24 is inserted into this through hole 42, thereby positioning the heat sink 30 on the rear frame 12.

Furthermore, as another feature of the display apparatus 2 in this embodiment, the heat sink 30 for the back lights 8 is in contact with the inner-frame region 22 of the rear frame 12, but is not in contact with the outer-frame region 20 of the rear frame 12, as shown in FIG. 5. As a result, an either end portion of the heat sink 30 and the outer-frame region 20 of the rear frame 12 have a space 44 therebetween for blocking the heat transfer from the heat sink 30 to the rear frame 12. Such a space 44 is formed for the reason that the inner face S1 of the rear frame 12 in the outer-frame region 20 is positioned on the side of the inner face S2 of the rear frame 12 in the inner-frame region 22 opposite the side on which the back lights 8 are positioned as described above.

[Effect]

Next, an effect obtained by the display apparatus 2 in this embodiment is described. When each of the LEDs 36 emits light, heat from each of the LEDs 36 is transferred to the heat sink 30 through the wiring substrate 34 and the double sided tape 38, and heat from the heat sink 30 is transferred to the rear frame 12. By doing so, the heat from each of the LEDs 36 is radiated through the heat sink 30 and the rear frame 12.

Generally, part of the heat from the heat sink 30 is transferred to the rear frame 12 through the screws 40, with the result that the rear frame 12 has a relatively high temperature at each of its fastened portions with the screws 40. In the display apparatus 2 in this embodiment, the fastened portions with the screws 40, which will have a relatively high temperature, are located only in the inner-frame region 22 so that the temperature rise of the rear frame 12 in the outer-frame region 20 exposed to outside the display apparatus 2 can be reduced.

Furthermore, the above-described space 44 blocks the heat transfer from the both end portions of the heat sink 30 to the outer-frame region 20 of the rear frame 12. With this, the temperature rise of the rear frame 12 in the outer-frame region 20 exposed to outside the display apparatus 2 can be effectively reduced.

Furthermore, the rear frame 12 includes the above-described slits 28. If the rear frame 12 does not include the slits 28, heat from the fastened portions with the screws 40 is transferred in the shortest path toward the outer-frame region 20 as indicated by dashed-line arrows in FIG. 7. Therefore, the efficiency of heat transfer from the fastened portions with the screws 40 to the outer-frame region 20 becomes relatively high, with the result that the rear frame 12 is likely to have a high temperature in the outer-frame region 20. In contrast, when the rear frame 12 includes the above-described slits 28, heat from the fastened portions with the screws 40 is transferred toward the outer-frame 20 in a detour path to avoid the slit 28 as indicated by solid-line arrows in FIG. 7. Therefore, the efficiency of heat transfer from the fastened portions with the screws 40 to the outer-frame region 20 becomes relatively low, with the result that the temperature rise of the rear frame 12 in the outer-frame region 20 can be more effectively reduced.

Furthermore, since the screws 40 are not located in the outer-frame region 20, the front end of each of the screws 40 is not seen from outside the display apparatus 2, allowing for an improved design.

[Variation]

Figure 8:
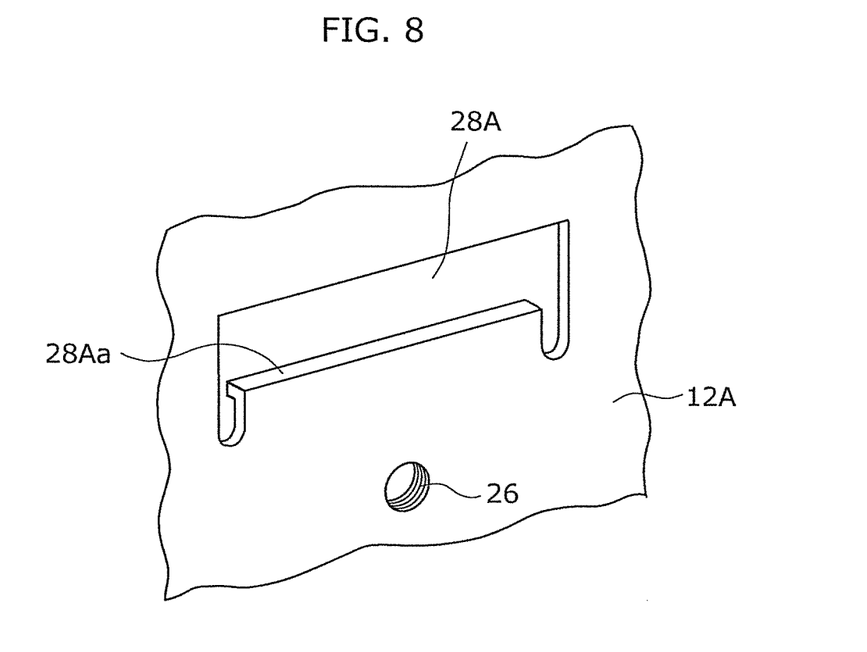
FIG. 8 is a main-part perspective view showing a variation of the slit.

Here, a variation of the slit is described with reference to FIG. 8. FIG. 8 is a main-part perspective view showing the variation of the slit. The slit 28 extends in an arc in the present embodiment, but may be a slit 28A which extends linearly as shown in FIG. 8. The slit 28A is located on an outer-frame region 20-side part of a periphery of the screw 40.

The slit 28A includes a bent edge portion 28Aa bent toward the liquid-crystal panel 6 (or opposite from the liquid-crystal panel 6). Such inclusion of the bent edge portion 28Aa can result in the slit 28A of a rear frame 12A having enhanced strength. It is to be noted that the bent edge portion 28Aa can be omitted.

Embodiment 2

Figure 9:
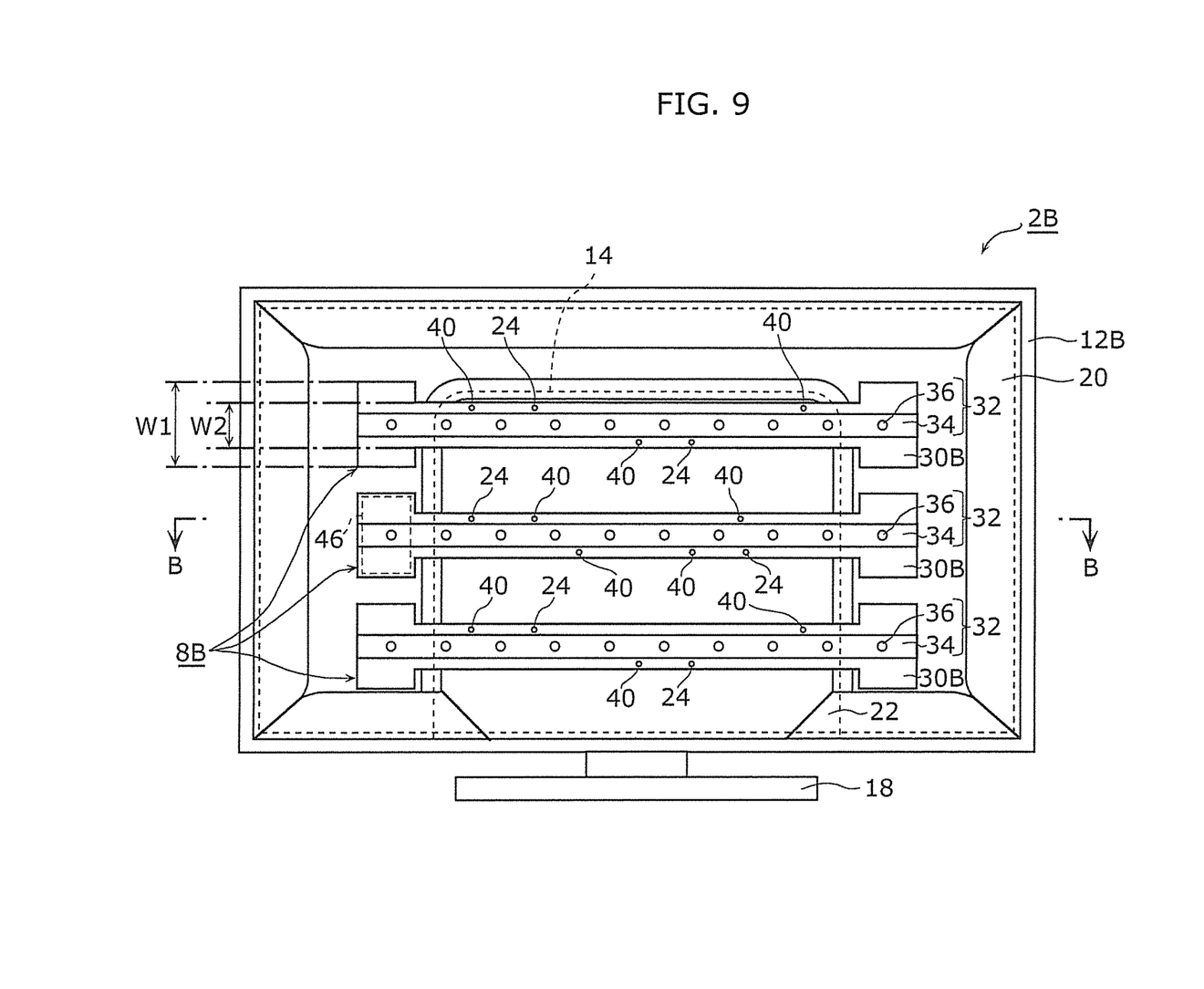
FIG. 9 is a plan view showing the interior of a display apparatus according to Embodiment 2 of the present invention.
Figure 10:
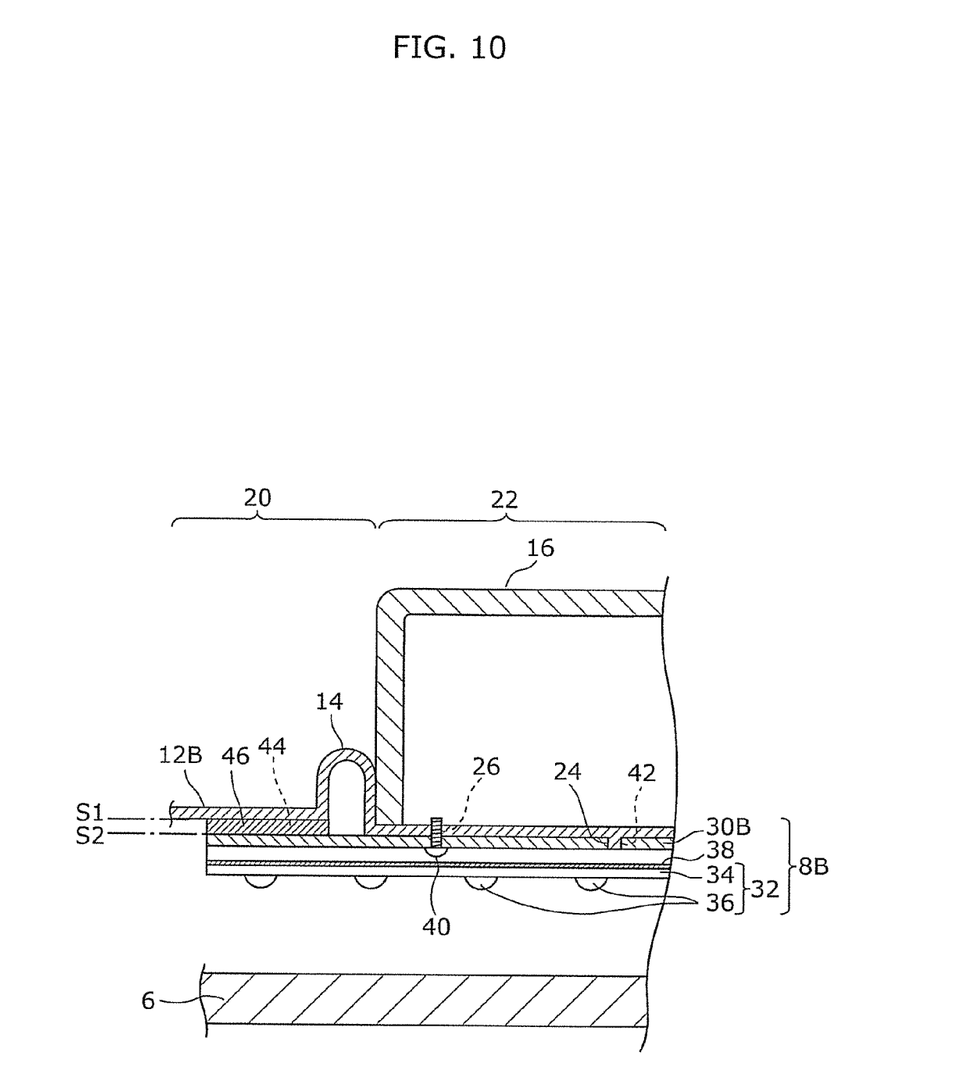
FIG. 10 is a main-part sectional view of the display apparatus taken along line B-B in FIG. 9.

Next, a configuration of a display apparatus according to Embodiment 2 of the present invention is described with reference to FIG. 9 and FIG. 10. FIG. 9 is a plan view showing the interior of the display apparatus according to Embodiment 2 of the present invention. FIG. 10 is a main-part sectional view of the display apparatus taken along line B-B in FIG. 9.

As shown in FIG. 10, there is a heat insulating sheet 46 between the outer-frame region 20 of a rear frame 12B and the both end portions of a heat sink 30B in a display apparatus 2B in this embodiment. This heat insulating sheet 46 blocks the heat transfer from the both end portions of the heat sink 30B to the outer-frame region 20 of the rear frame 12B. With this, the temperature rise of the rear frame 12B in the outer-frame region 20 exposed to outside the display apparatus 2B can be effectively reduced.

Furthermore, as shown in FIG. 9, a transverse dimension W1 of the heat sink 30B in the outer-frame region 20 is larger than a transverse dimension W2 of the heat sink 30B in the inner-frame region 22 in a back light 8B in this embodiment. The heat transfer from the heat sink 30B to the rear frame 12B is blocked in the outer-frame region 20 as described above, and when the heat sink 30B has a large surface area in the outer-frame region 20, the heat transferred to the heat sink 30B can be efficiently radiated.

Furthermore, as shown in FIG. 9, the screws 40 are arranged in a staggered pattern in the back lights 8B in this embodiment. The rear frame 12B will have a relatively high temperature at the fastened portion with the screw 40 as described above, and when the screws 40 are arranged in a staggered pattern, the temperature distribution in the inner-frame region 22 can be substantially uniform.

Although the display apparatuses according to Embodiments 1 and 2 of the present invention have been described above, the present invention is not limited to these embodiments. For example, the above embodiments may be combined.

Although the above has described the embodiments where the display apparatus is a liquid-crystal television receiver, the display apparatus may be other than the liquid-crystal television receiver, and may also be, for example, a liquid-crystal monitor for a personal computer, and the like.

Although a plurality of back lights are provided in the above embodiments, it may also be possible to provide only a single back light.

Although the connecting part is a screw in the above embodiments, the connecting part may be, for example, a double sided tape, a hook, a fixing claw, etc., which have heat conductivity. For example, when the connecting part is a hook provided on the heat sink, this hook is caught in a supporting hole of the rear frame. Alternatively, when the connecting part is a fixing claw provided on the rear frame, this fixing claw is inserted into a supporting hole of the heat sink and then is folded in a predetermined direction.

Although the back light has a heat sink in the above embodiments, this heat sink can be omitted. In this case, the wiring substrate is supported by the rear frame via the connecting part so as to allow heat transfer therebetween.

Although the whole inner face of the rear frame in the outer-frame region is positioned on the side of the inner face of the rear frame in the inner-frame region opposite a side on which the liquid-crystal panel is positioned in the above embodiments, it may be that only a portion of the whole inner face of the rear frame in the outer-frame region which corresponds to at least the back light is positioned on the side of the inner face of the rear frame in the inner-frame region opposite a side on which the liquid-crystal panel is positioned.

Although the inner face of the rear frame in the outer-frame region is positioned on the side of the inner face of the rear frame in the inner-frame region opposite the side on which the liquid-crystal panel is positioned in the above embodiments, it may be that the inner face of the rear frame in the outer-frame region and the inner face of the rear frame in the inner-frame region are on the same plane and in this state, the back light in the outer-frame region is, for example, bent toward the liquid-crystal panel. With this, the back light and the outer-frame region of the rear frame can be spaced apart from each other.

Alternatively, it may be that the inner face of the rear frame in the outer-frame region and the inner face of the rear frame in the inner-frame region are on the same plane and in this state, the back light is supported in the inner-frame region of the rear frame with a metallic spacer therebetween. Even with such a configuration, the back light and the outer-frame region of the rear frame can be spaced apart from each other.

Although the slit extends in an arc or extends linearly in the above embodiments, the shape of the slit is not limited to these examples and may be set to another shape when needed.

Although the wiring substrate is joined to the heat sink with a double sided tape in the above embodiments, the wiring substrate may be joined to the heat sink with a screw or the like, for example.

Although the LED is used as an illuminant for the back light in the above embodiments, a cold cathode fluorescent lamp (CCFL) or the like can be used, for example.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The display apparatus in the present invention is applicable, for example, as a liquid-crystal television receiver, a liquid-crystal monitor for a personal computer, and the like.

The invention claimed is:

1. A display apparatus comprising:
   a display panel;
   a light source substrate including a light source which emits light toward the display panel;
   a support member to which the light source substrate is attached; and
   a cover member which partially covers a face of the support member opposite to a face, to which the light source substrate is attached, of the support member,
   wherein the light source substrate is fixed in a covered region of the support member, covered by the cover member, and
   a distance between the support member and the light source substrate in the covered region is shorter than a distance between the support member and the light source substrate outside the covered region, the distances being in a direction perpendicular to a display surface of the display panel.

2. The display apparatus according to claim 1,
   wherein an inner face of the support member outside the covered region is positioned on a side of an inner face of the support member inside the covered region opposite a side on which the light source substrate is positioned.

3. The display apparatus according to claim 1,
   wherein the light source substrate and the support member have a heat insulating sheet therebetween outside the covered region.

4. The display apparatus according to claim 1, further comprising:
   a heat sink to which the light source substrate is attached and which is capable of conducting heat to the support member,
   wherein a transverse dimension of the heat sink outside the covered region is larger than a transverse dimension of the heat sink inside the covered region.

5. The display apparatus according to claim 1,
   wherein the support member includes a slit in part of a periphery of a connecting part for fixing the light source substrate, the part being located on an outer side inside the covered region.

6. The display apparatus according to claim 5,
   wherein the slit extends in an arc, the arc being curved around the connecting part.

7. The display apparatus according to claim 5,
   wherein the support member includes a bent edge portion which is provided near the slit and bent toward the display panel or bent opposite from the display panel.

8. The display apparatus according to claim 1,
   wherein the light source substrate comprises a plurality of the light source substrates,
   respective light source substrates of the plurality of light source substrates are arranged substantially parallel to each other, and
   a plurality of connecting parts for fixing the respective light source substrates onto the support member are arranged in a staggered pattern.

9. The display apparatus according to claim 1,
   wherein the light source substrate extends beyond the covered region.

10. The display apparatus according to claim 1,
    wherein the support member includes a protruding portion, the protruding portion extending along an outer-circumferential portion of the cover member and protruding in an opposite direction from the display panel.

11. The display apparatus according to claim 1, further comprising
    a substrate attached to only a part of the face of the support member, the part being covered by the cover member.

* * * * *